United States Patent [19]

Han

[11] Patent Number: 5,216,999
[45] Date of Patent: Jun. 8, 1993

[54] WIRE SAW

[75] Inventor: Jung S. Han, Suwon, Rep. of Korea

[73] Assignee: EHWA Diamond Ind. Co., Ltd., Kyongki, Rep. of Korea

[21] Appl. No.: 822,810

[22] Filed: Jan. 21, 1992

[30] Foreign Application Priority Data

Jan. 25, 1991 [KR] Rep. of Korea .................. 91-1284
Nov. 14, 1991 [KR] Rep. of Korea .................. 91-20265
Dec. 10, 1991 [KR] Rep. of Korea .................. 91-22593

[51] Int. Cl.$^5$ .............................................. B28D 1/08
[52] U.S. Cl. ........................................ 125/21; 125/22
[58] Field of Search .............. 83/651.1; 125/21, 22, 125/18, 12

[56] References Cited

U.S. PATENT DOCUMENTS

| | | | |
|---|---|---|---|
| 2,696,228 | 12/1954 | Bowen | 125/21 |
| 3,884,212 | 5/1975 | Armstrong | 125/21 |
| 4,856,490 | 8/1989 | Kawase et al. | 125/21 |
| 4,907,564 | 3/1990 | Sowa et al. | 125/21 |
| 5,086,751 | 2/1992 | Pfister et al. | 125/22 |

FOREIGN PATENT DOCUMENTS

| | | | |
|---|---|---|---|
| 0718311 | 10/1966 | Italy | 125/21 |
| 2059273 | 2/1990 | Japan | 125/21 |
| 2059274 | 2/1990 | Japan | 125/21 |
| 1411479 | 7/1988 | U.S.S.R. | 125/21 |
| 1491736 | 7/1989 | U.S.S.R. | 125/21 |

*Primary Examiner*—Robert A. Rose
*Attorney, Agent, or Firm*—Vidas, Arrett & Steinkraus

[57] ABSTRACT

A wire saw comprising a wire rope 120, a plurality of abrasive sleeves 110 each including a cylindrical mount 112 and an abrasive metal layer 114, an elastic material layer 130 of resin surrounding the wire rope 120 between the abrasive sleeves 110 and between each of the abrasive sleeves 110 and the wire rope 120, and a clamping pipe 140 for making the wire saw be endless to form a loop. The abrasive sleeves 110 surround the wire rope and are spaced at predetermined intervals longitudinally of the wire rope. The cylindrical mount 112 includes a pair of annular grooves formed on outer opposite ends thereof and a pair of through-holes diagonally formed thereon. The elastic material layer 130 includes a plurality of annular grooves 132 spaced at predetermined intervals and formed by means of a shape of a mold 200, thereby providing a straightness for the wire rope regardless of an injection pressure of resin injected into the mold 200. The clamping pipe 140 comprises a center protrusion 142, end compressed depressions 144 and a cutting layer 146 covering the whole outer surface thereof in order to have a similar outer shape to that of the wire saw. The cutting layer 146 has diamond or carborundum particles which are dispersed thereon by means of electro deposition or hard facing.

5 Claims, 4 Drawing Sheets

WIRE SAW

BACKGROUND OF THE INVENTION

1. Field of The Invention

The present invention relates in general to a wire saw used for cutting stone, concrete and the like, and more particularly to a wire saw which prevents a gap from being formed between a cylindrical mount of each of abrasive sleeves and an elastic material layer, certainly provides a desired straightness of a wire rope owing to flow characteristic of resin according to a shape of the elastic material layer, and is made endless to form a loop by means of a clamping pipe having a similar outer shape to that of the wire saw, thereby improving the using life thereof.

2. Description of The Prior Art

With reference to FIG. 2 showing a wire saw which is disclosed in U.S. Pat. No. 4,907,564, entitled "WIRE SAW", and is of interest to this invention, the known wire saw generally comprises a plurality of abrasive sleeves 10 surrounding a wire rope 20 and being spaced at predetermined intervals longitudinally of the wire rope 20, and a cylindrical elastic material layer 30 of resin such as natural rubber, polyurethane or the like which is integrally formed between the abrasive sleeves 10 in such a manner as to surround the wire rope 20. Here, the wire rope 20 has to be disposed in order to have a desired straightness.

Each of the abrasive sleeve 10 comprises a substantially cylindrical mount 12, and an abrasive metal layer 14 circumferentially formed on the outer peripheral surface of the mount 12. The mount 12 is disposed as buried under the elastic material layer 30 and surrounding the wire rope 20, and made, for example, of stainless steel and has copper plating applied to at least the outer peripheral surface thereof. The abrasive metal layer 14 is formed by dispersing abrasive particles, such as diamond or carborundum particles, in a metal matrix.

As shown in FIG. 1 which is a diagrammatic view for showing a method of cutting concrete by a conventional wire saw, when it is desired to cut a concrete wall 60, first, through-holes 61 are formed in the wall 60 by a core drill or the like. Sequentially, the wire saw is passed through these through-holes 61 and entrained around a drive pulley 50 while it is made endless to form a loop. At this time, a clamping pipe is used to connect both ends of the wire saw to each other in order to make the wire saw endless. Here, the wire saw is adequately twisted before forming the loop. In result upon driving the wire saw by means of the drive pulley 50, simultaneously with rotating, the wire saw revolves. The concrete wall 60 is, therefore, cut by means of the abrasive metal layer 14 of the abrasive sleeve 10. As the cutting operation by the wire saw proceeds, the drive pulley 50 is moved along guide rails from a first position represented at the solid line of FIG. 1 to a second position represented at the phantom line of the drawing.

According to the above known wire saw, it is proposed that the clamping pipe comprises a threaded connecting sleeve. However, this type of clamping pipe has a disadvantage in that it may easily loose the clamping state thereof during the cutting operation and also requires a considerable burdensome work in making the wire saw be endless. Thus, the clamping pipe conventionally comprises, as shown in FIG. 3, a connecting pipe 40 into both hollow ends of which opposite ends of the wire rope 20 protruding from the opposite ends of the wire saw are inserted in order to contact with each other, then the assembly of the wire rope 20 and the pipe 40 is compressed by means of a conventional compressing device in order to make the wire saw be endless.

However, the known wire saw has disadvantages in that the bonding force between the abrasive sleeves 10 and the elastic material layer 30 is relatively weak, and also in operation, simultaneously with rotation owing to the torsion of the wire saw the abrasive sleeves 10 revolve at a revolution speed of about 20 m/sec, thus a separation of the abrasive sleeves 10 from the elastic material layer 30 easily occurs due to a relative abrasion therebetween.

In other words, the wire saw is, as described above, provided with the elastic material layer 30 integrally formed therewith between the abrasive sleeves 10 in order to space the sleeves 10 at the predetermined intervals and also provide the wire saw with flexibility. Hence, a gap easily occurs between the cylindrical mount 12 of each sleeve 10 and the elastic material layer 30, furthermore, the gap allows a foreign substance such as stone particles, cutting fluid and the like to easily enter, thereby causing the wire rope 20, not to speak of the elastic material layer 30 to be suddenly cut before completing the predetermined using life of the wire saw. In result, the known wire saw has disadvantage in that it can not provide a required reliability.

In addition, it is required that the wire rope 20 is longitudinally disposed in the wire saw in order to have the desired straightness. However, there is no means for causing the wire rope 20 to be reliably maintained in the longitudinal center of a mold for forming the elastic material layer 30, thus the wire rope 20 may be radially biased due to an injection pressure of resin during the injection molding of the elastic material layer 30 in the mold, thereby resulting in a bad longitudinal straightness of the wire rope 20 as shown in FIG. 2. Thus, the wire rope 20 of the wire saw tends to compensate the longitudinal straightness thereof during the revolution for performing the cutting operation so that there occurs unbalance in force distribution on the circumferential surface of the abrasive metal layer 14 of each abrasive sleeve 10 due to the longitudinal straightness compensating force of the wire rope 20, thereby resulting in an eccentric abrasion of the abrasive metal layer 14. In result, the known wire saw has a disadvantage in that the using life thereof is obliged to be shortened due to the eccentric abrasion of the abrasive metal layer 14.

Also, the connecting pipe 40 has to provide a desired clamping force for the loop of the wire saw so that it conventionally has a construction of relatively longer length than the distance between the abrasive sleeves 10 in order to provide the desired clamping force when it is compressed for making the wire saw endless. Thus, there may occur unbalance in the load distribution to the abrasive sleeves 10 due to the relatively longer length of the connecting pipe 40, thereby causing a relatively heavy load to be imposed on the abrasive metal layers 14 of the two abrasive sleeves 10 which are disposed at opposite ends of the connecting pipe 40. Furthermore, the connecting pipe 40 conventionally comprises a copper pipe or a stainless steel pipe which has a lower consume resistance than that of the abrasive metal layer 14 of the sleeve 10, thus it is more easily abraded than the abrasive metal layer 14 of the sleeve 10. In result, the known wire saw has a disadvantage in that the connecting pipe 40 thereof may be easily cut due to the unbalance in the load distribution to the abrasive sleeves 10 during the cutting operation and also the lower consume resistance thereof.

SUMMARY OF THE INVENTION

It is, therefore, an object of the present invention to provide a wire saw in which the above-mentioned disadvantages can be overcome and of which abrasive sleeves have a good engaging force with respect to an elastic material layer in order to prevent an occurrence of a gap therebetween, a wire rope is longitudinally disposed in order to have a desired straightness, and clamping means for making the wire saw be endless provides an uniform load distribution to the whole abrasive sleeves and also has a predetermined cutting performance.

The above-mentioned object of this invention can be accomplished by providing a wire saw comprising a wire rope; a plurality of abrasive sleeves each including a cylindrical mount and an abrasive metal layer circumferentially disposed on said mount in order to cover a center portion of the mount, said abrasive sleeves surrounding the wire rope and spaced at predetermined intervals longitudinally of the wire rope; an injection molded elastic material layer of resin surrounding said wire rope between said abrasive sleeves and between each of said abrasive sleeves and said wire rope; sealing means for protecting the wire rope from corrosion by engaging said abrasive metal layer of each abrasive sleeve with said elastic material layer in order to prevent occurrence of a gap therebetween during a cutting operation of the wire saw, said sealing means comprising a pair of annular grooves formed on outer opposite ends of the cylindrical mount of each of said abrasive sleeves and a pair diagonally positioned of through-holes formed by perforating a surface of the cylindrical mount in order to have a predetermined distance therebetween; center positioning means for providing a desired straightness for said wire rope regardless of an injection pressure of resin injected into a mold during an injection molding for forming said elastic material layer, said center positioning means comprising a plurality of annular grooves in said elastic material layer between adjacent abrasive sleeves, said annular grooves being spaced at predetermined intervals and being formed by means of a plurality of elastic material layer forming parts of said mold during the injection molding, the distance between the bottom surface of said annular grooves and the outer surface of the wire rope being sufficiently small so as to prevent radial displacement of the wire rope by injected resin during said injection molding operation; and clamping means for making the wire saw be endless to form a loop and comprising a center protrusion, end compressed depressions and a cutting layer covering the whole outer surface thereof in order to have a similar outer shape to that of the wire saw, said cutting layer having diamond or carborundum particles which are dispersed on said cutting layer by means of electro deposition or hard facing.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 4A:
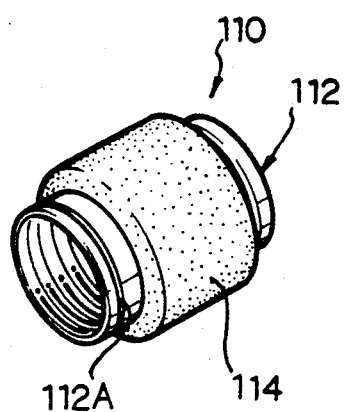
FIG. 4A is a perspective view of a abrasive sleeve of a wire saw in accordance with the present invention.
Figure 4B:
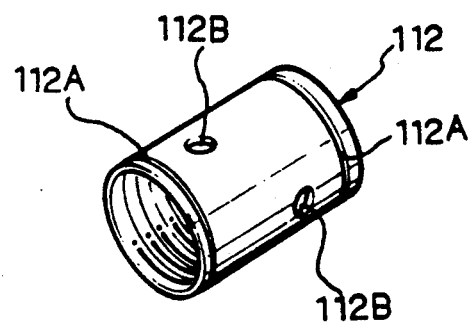
FIG. 4B is a perspective view of a cylindrical mount of the abrasive sleeve of FIG. 4A.
Figure 5:
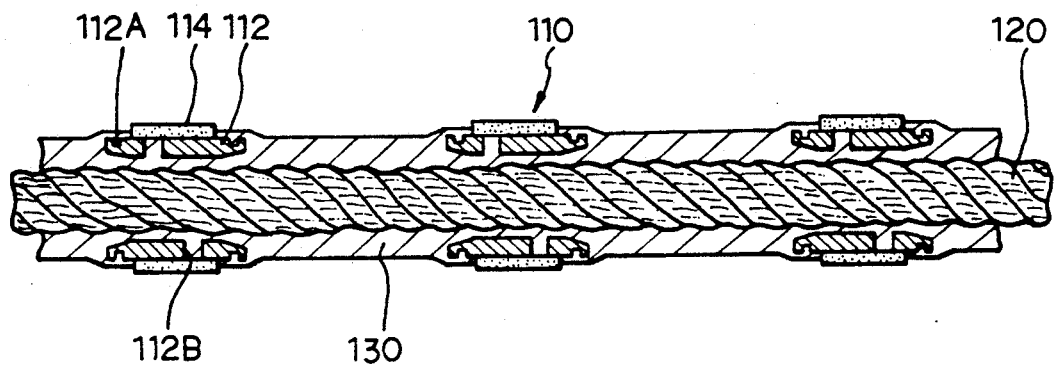
FIG. 5 is a longitudinal sectional view of a wire saw particularly showing the difference of cylindrical mount between the prior art and the present invention.

Referring to FIGS. 4A, 4B and 5, FIG. 4A is a perspective view of an abrasive sleeve of a wire saw of this invention, FIG. 4B is a perspective view of a cylindrical mount of the abrasive sleeve of FIG. 4A, and FIG. 5 is a longitudinal sectional view of the wire saw of this invention. As shown in the drawings, the wire saw comprises a plurality of abrasive sleeves 110 surrounding a wire rope 120 and being spaced at predetermined intervals longitudinally of the wire rope 120, and a cylindrical elastic material layer 130 of resin such as natural rubber, polyurethane or the like which is integrally formed between the abrasive sleeves 110 in such a manner as to surround the wire rope 120. The wire rope 120 is longitudinally disposed in order to have a desired straightness.

Each abrasive sleeve 110 comprises the cylindrical mount 112 and the abrasive metal layer 114 which is circumferentially disposed on the mount 112 in order to cover a center portion of the mount 112. The abrasive metal layer 114 is formed by dispersing abrasive particles, such as diamond or carborundum particles, in a metal matrix. The cylindrical mount 112 of the abrasive sleeve 110 is provided with a pair of annular grooves 112A formed on outer opposite ends thereof, respectively, and a pair of diagonally positioned through-holes 112B formed by perforating a surface thereof. The through-holes 112B of the mount 112 are formed in order to be covered with the abrasive metal layer 114 when the mount 112 is provided with the layer 114. Thus, the holes 112B is formed as having a shorter longitudinal distance therebetween than the length of the metal layer 114.

To manufacture the wire saw according to this invention, the abrasive sleeves 110 are first arranged in a mold in order to be spaced at the predetermined intervals, then the wire rope 120 is longitudinally disposed. Thereafter, the resin material is injected into the mold in order to fill the space inside the mold, thereby accomplishing the wire saw by forming the elastic material layer 130.

Figure 6:
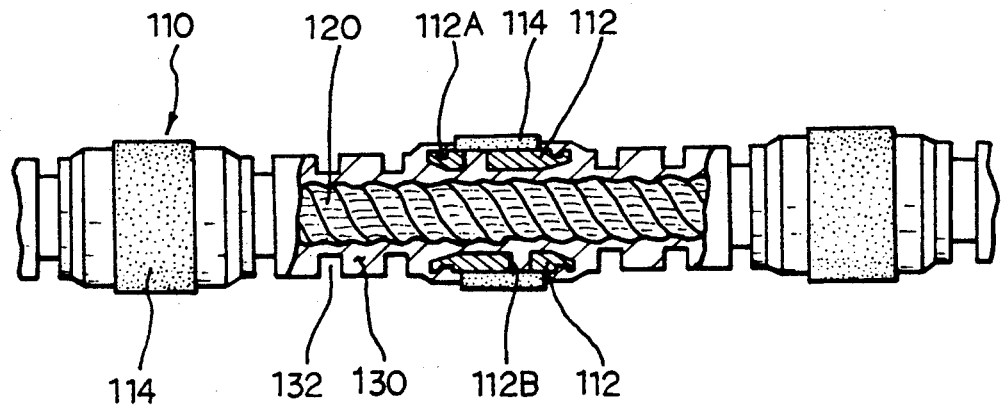
FIG. 6 is a longitudinally partially sectioned view of an elastic material layer of the wire saw of FIG. 5.
Figure 7:
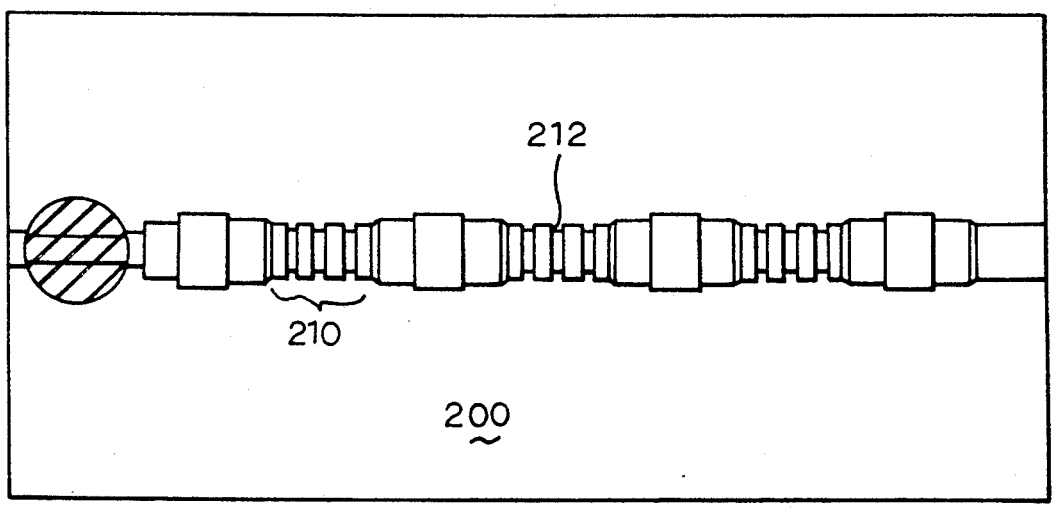
FIG. 7 is a plane view of a mold for forming the elastic material layer of FIG. 6.

Turning next to FIGS. 6 and 7, FIG. 6 is a partially sectioned view of the elastic material layer 130, and FIG. 7 is a plane view of the mold 200 for forming the elastic material layer 130. As shown in the drawings, the mold 200 has a plurality of elastic material layer forming parts 210 each of which has a plurality of annular protrusions 212 spaced at predetermined intervals, thereby forming a plurality of annular grooves in the elastic material layer 130.

Figure 8:
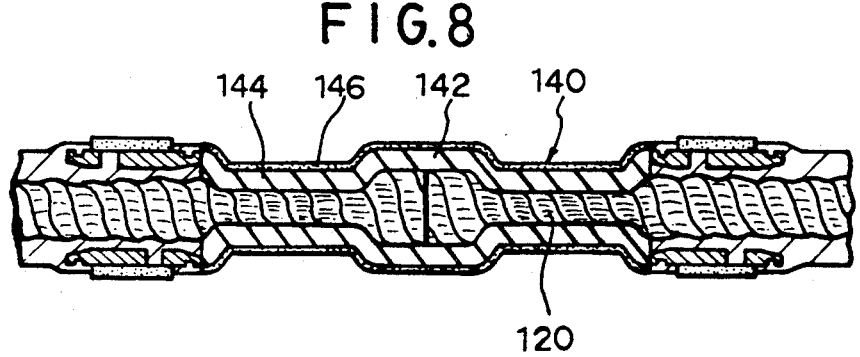
FIG. 8 is a view corresponding to FIG. 3, but showing the clamping means of the present invention.

FIG. 8 is a longitudinal sectional view for representing a clamping state of the present wire saw by means of a clamping pipe 140 according to this invention. As shown in the drawing, both ends of the wire rope 120 protruding from the both ends of the wire saw are connected to each other in order to make a loop by means of the clamping pipe 140 which is compressed by means of a compressing device after receiving therein the both ends of the wire rope 120. During making the wire saw endless, the assembly of the clamping pipe 140 and the wire rope 120 is compressed in order to have a center protrusion 142 and a pair of end compressed depressions 144. Furthermore, the clamping pipe 140 is provided with a cutting layer 146 which covers the whole outer surface thereof and has diamond or carborundum particles which is dispersed thereon by means of electro deposition or hard facing.

The operational effect of the wire saw having the above-mentioned construction will be described hereinafter.

In forming the elastic material layer 130 for accomplishing the wire saw, the abrasive sleeves 110 each comprising the abrasive metal layer 114 and the cylindrical mount 112 are arranged at predetermined positions in the mold 200 in order to be spaced at the predetermined intervals, then the wire rope 120 is longitudinally disposed in order to have a desired straightness. Thereafter, resin such as natural rubber, synthetic resin and the like is injected into the mold 200 in order to fill the space inside the mold 200, thereby forming the elastic material layer 130. At this time, the annular grooves 112A of each mount 112 is filled with the resin material in order to improve the engaging force therebetween due to an engagement in the form of prominence and depression. Thus, there does not occur a gap between the mount 112 of the sleeve 110 and the elastic material layer 130 during the cutting operation, thereby preventing the foreign substance such as the stone particles, the cutting fluid and the like from entering a gap between the mount 112 and the elastic material layer 130.

In addition, the through-holes 112B are filled with the resin during the forming procedure of the elastic material layer 130 so that the abrasive sleeves 110 have a relatively strong support force which is capable of endure the torque generating as the sleeves 110 tends to be rotated during rotation of the wire saw in the cutting operation.

On the other hand, when the resin is injected into the mold 200, the wire rope 120 tends to be radially biased due to the injection pressure of the resin as described above. However, the mold 200 has the elastic material layer forming parts 210 each of which has the annular protrusions 212 spaced at the predetermined intervals, thereby efficiently preventing the radial eccentricity of the wire rope 120. In other words, there is only a radial space of about 1 mm between the inner surface of the annular protrusions 212 of the mold 200 and the outer surface of the wire rope 120, thus the radial space is certainly filled with the resin due to flow characteristic of the resin during the injection molding, thereby causing the wire rope 120 to be efficiently prevented from being forcedly moved owing to the injection pressure of the resin. In result, the wire rope 120 has a desired straightness regardless of the injection pressure of the resin during the injection molding.

Figure 1:
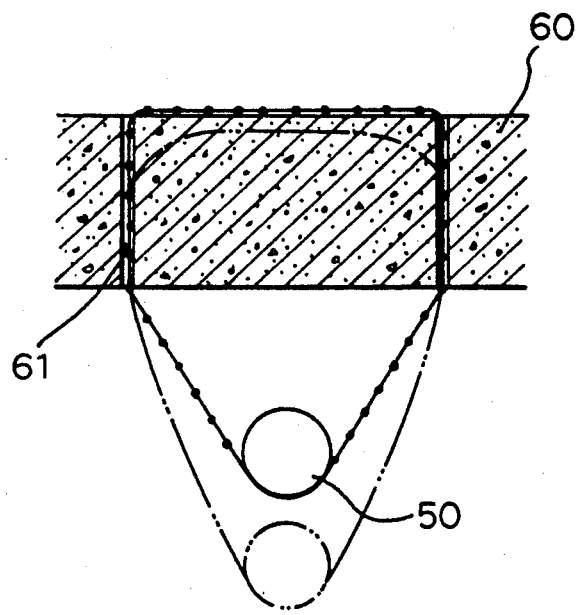
FIG. 1 is a diagrammatic view for showing a method of cutting concrete by a conventional wire saw.
Figure 2:
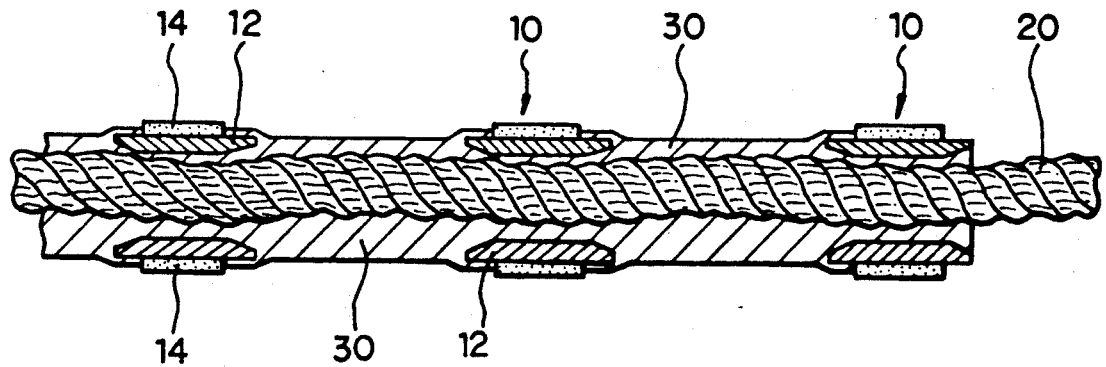
FIG. 2 is a longitudinal sectional view of a wire saw in accordance with the prior art.
Figure 3:
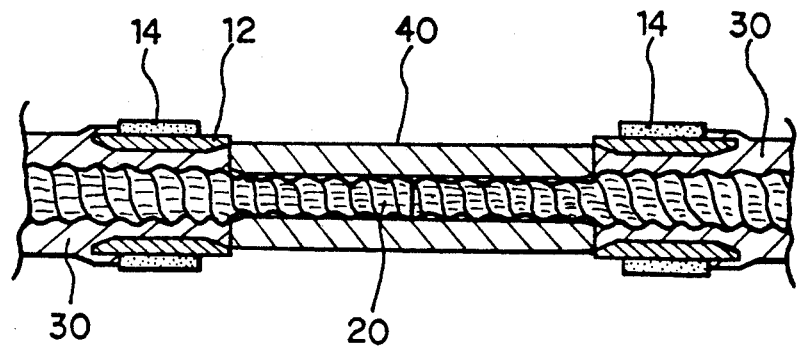
FIG. 3 is a longitudinal sectional view for representing a clamping state of the known wire saw by means of a known clamp.

As described above, the wire saw is made endless to form the loop by means of the clamping pipe 140 which is compressed in order to have the center protrusion 142 and the end compressed depressions 144, and also provided with the cutting layer 146 covering the whole outer surface thereof and having diamond or carborundum particles. Thus, when the loop of the wire saw is revolved by means of the conventional drive pulley 50 (see FIG. 1) simultaneously with being rotated in order to perform the cutting operation, the clamping pipe 140 can cut stone or concrete in the same manner as the abrasive metal layer 114 of each abrasive sleeve 110 due to the center protrusion 142 provided with the cutting layer 146 having the diamond or the carborundum particles. Furthermore, the clamping pipe 140 improves the consume resistance thereof due to the cutting layer 146 having the diamond or the carborundum particles.

Additionally, the clamping pipe 140 of this invention comprises the center protrusion 142 and the end compressed depressions 144 in order to have a similar shape to that of the wire saw comprising the abrasive sleeves 110 and the elastic material layer 130 so that even though it has a predetermined length which is capable of certainly providing a desired clamping force for the wire rope 120 of the wire saw, it uniformly distributes the load imposed on the abrasive sleeves 110, thereby efficiently preventing the two abrasive sleeves 110 which are disposed at opposite ends of the clamping pipe 140 from being heavily loaded.

As described above, the present invention provides a wire saw in which a cylindrical mount of each abrasive sleeve is certainly engages with an elastic material layer by virtue of annular grooves and through-holes each formed on the cylindrical mount, thereby certainly preventing a gap which may allow the foreign substance such as stone particles or cutting fluid to enter from forming between the cylindrical mount and the elastic material layer. Additionally, the wire saw of this invention is formed as having the elastic material layer provided with a plurality of annular grooves by virtue of the shape of a mold so that there is only a minute radial space of about 1 mm between the bottom surface of each annular groove of the elastic material layer and the outer surface of the wire rope longitudinally surrounded by the elastic material layer. Thus, even though the wire rope is forced by the injection pressure of resin during injection molding for forming the elastic material layer, it can be efficiently prevented from being radially moved by virtue of the flow characteristic of the injected resin which tends to flow through the above minute radial spaces between the annular grooves of the elastic material layer and the wire rope, thereby accomplishing a desired straightness of the wire rope regardless of the injection pressure of the resin during the injection molding. Furthermore, the wire saw is made endless to form a loop by means of a clamping pipe comprising a center protrusion and a pair of compressed depressions and also covered with a cutting layer so that the clamping pipe provides a similar shape to that of the wire saw and also a desired consume resistance.

In result, the wire saw of this invention provides advantage in that it can be efficiently prevented from being suddenly cut, thereby improving the using life thereof such as two times longer using life than those of conventional wire saws.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A wire saw comprising:
   a wire rope;
   a plurality of abrasive sleeves each including a cylindrical mount and an abrasive metal layer circumferentially disposed on said mount in order to cover a center portion of the mount, said abrasive sleeves surrounding the wire rope and spaced at predetermined intervals longitudinally of the wire rope;
   an injection molded elastic material layer of resin surrounding said wire rope between said abrasive sleeves and between each of said abrasive sleeves and said wire rope;
   sealing means for preventing corrosion of the wire rope by engaging said abrasive metal layer of each abrasive sleeve with said elastic material layer in order to prevent occurrence of a gap therebetween during a cutting operation of the wire saw; and
   center positioning means for providing a desired straightness for said wire rope regardless of an injection pressure of resin injected into a mold during an injection molding operation for forming said elastic material layer, said center positioning means comprising a plurality of annular grooves in said elastic material layer between adjacent abrasive sleeves, said annular grooves being formed by means of a plurality of elastic material layer forming parts of said mold during the injection molding operation, the distance between the bottom surface of said annular grooves and the outer surface of the wire rope being sufficiently small so as to prevent radial displacement of the wire rope by injected resin during said injection molding operation.

2. A wire saw according to claim 1, wherein said sealing means comprises a pair of annular grooves formed on outer opposite ends of the cylindrical mount of each of said abrasive sleeves.

3. A wire saw according to claim 2, wherein said sealing means further comprises a pair of diagonally positioned through-holes formed by perforating a cylindrical mount.

4. A wire saw according to claim 1, wherein said wire saw is made endless to form a loop by means of clamping means comprising a center protrusion, end compressed depressions and a cutting layer covering the whole outer surface thereof in order to have a similar outer shape to that of the wire saw, said cutting layer having diamond or carborundum particles which are dispersed on said cutting layer by means of electro deposition or hard facing.

5. A wire saw according to claim 1, wherein said center positioning means comprises a plurality of annular grooves in said elastic material layer, said annular grooves being formed by means of a plurality of elastic material layer forming parts of said mold during the injection molding operation, the distance between the bottom surface of said annular grooves and the outer surface of the wire rope being no more than 1 mm.

* * * * *